United States Patent Office 3,551,132
Patented Dec. 29, 1970

3,551,132
PHYTOXIC COMPOSITIONS AND METHODS
Robert F. Husted, Florissant, Mo., assignor to Monsanto Company, St. Louis, Mo., a corporation of Delaware
No Drawing. Filed June 19, 1967, Ser. No. 647,190
Int. Cl. A01n 9/20
U.S. Cl. 71—111
25 Claims

ABSTRACT OF THE DISCLOSURE

Compositions comprising 2',6'-diethyl - N - methoxymethyl-2-chloroacetanilide and certain 3'-(carbamoyloxy)anilides exhibit unexpected phytotoxicity.

This invention relates to phytotoxic compositions and to methods of controlling the growth of plants.

The term "phytotoxicant" as used herein and in the appended claims means materials which (1) effectively control all plants in a given locus of (2) selectively control the growth of one or more plant species in the presence of other plants. In like manner, "phytotoxic" and "phytotoxicity" are used to identify the overall and selective control activity of the compositions of this invention.

The term "plant" as used herein and in the appended claims is inclusive of dormant seeds, germinant seeds, germinative seeds, emerging seedlings and established woody and herbaceous vegetation including the roots and above-ground portions.

The term "control" as used herein and in the appended claims is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

The term "phytotoxic formulation" as used herein means a phytotoxic composition of this invention in combination with an adjuvant.

In accordance with this invention it has been discovered that phytotoxic compositions comprising 2',6'-diethyl-N-methoxymethyl-2-chloroacetanilide and certain 3'-(carbamoyloxy)anilides exhibit phytotoxic effectiveness not possessed by either component employed alone. The phytotoxic compositions of this invention produce phytotoxic results substantially greater than the sum of the results for each component alone. In addition, the phytotoxic compositions are surprisingly selective. They are non-toxic to many crop plants, particularly cotton, corn and soybeans, and thus can be used in the control of both monocotyledonous and dicotyledonous weed plants in crops.

The phytotoxic compositions of this invention comprise 2',6' - diethyl-N-methoxymethyl-2-chloroacetanilide and a 3'-(carbamoyloxy)anilide selected from the group consisting of 3'-(t-butylcarbamoyloxy)propionanilide, 3'-(t-butylcarbamoyloxy) - 2 - methylpropionanilide, 3 - (t-butylcarbamoyloxy)-2-methylvaleranilide, 3' - (n-propylcarbamoyloxy) - 2 - methylpropionanilide, 3'-(methylcarbamoyloxy)-2-methylvaleranilide, 3' - (n-butylcarbamoyloxy) - 2 - methylpropionanilide, 3-(isopropylcarbamoyloxy)-propionanilide, 3'-(ethylcarbamoyloxy)propionanilide, 3'-(cyclohexylcarbamoyloxy)propionanilide, and 3'-(t-butylcarbamoyloxy)cyclopropanecarboxanilide, said 3'-(carbamoyloxy)anilide being present in an amount from about 1 to about 100 parts by weight per 10 parts by weight of 2',6'-diethyl-N-methoxymethyl-2-chloroacetanilide. The preferred phytotoxic compositions contain from about 5 to about 50 parts by weight of 3'-(carbamoyloxy)-anilide per 10 parts by weight of 2',6'-diethyl-N-methoxymethyl-2-chloroacetanilide.

For the sake of brevity and simplicity, the term "active ingredient" is used hereinafter in this specification to describe the phytotoxic 2',6'-diethyl-N-methoxymethyl-2-chloroacetanilide/3'-(carbamoyloxy)anilide compositions of this invention.

In practicing the phytotoxic or herbicidal methods of this invention the active ingredients can be used alone or in combination with a material referred to in the art as an adjuvant in liquid or solid form. Phytotoxic formulations are prepared by admixing the active ingredient with an adjuvant including diluents, extenders, carriers and conditioning agents to provide compositions in the form of finely-divided particulate solids, granules, pellets, solutions, dispersions or emulsions. Thus the active ingredient can be used with an adjuvant such as a finely-divided particulate solid, a liquid of organic origin, water, a wetting agent, dispersing agent, an emulsifying agent or any suitable combination of these. The phytotoxic formulations usually contain from about 0.01 percent to about 99 percent by weight of active ingredient.

Typical finely-divided solid carriers and extenders which can be used with the active ingredients include for example, the talcs, clays, pumice, silica, diatomaceous earth, quartz, fuller's earth, salt, sulfur, powdered cork, powdered wood, ground corn cobs, walnut flour, chalk, tobacco dust, charcoal, volcanic ash, cottonseed hulls, wheat flour, soybean flour, tripoli and the like. Typical liquid diluents include for example, kerosene, Stoddard solvent, hexane, water, benzene, toluene, acetone, ethylene dichloride, xylene, alcohols, diesel oil, glycols and the like.

Phytotoxic formulations, particularly liquids and wettable particles, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents are included therein.

The following examples will illustrate the invention. In these examples, as well as in the specification and appended claims, parts and percent are by weight unless otherwise indicated.

EXAMPLE 1

The phytotoxic activity of the active ingredients of this invention is demonstrated as follows: A good grade of top soil is placed in aluminum pans and compacted to a depth of ½" from the top of each pan. A predetermined number of seeds of each of various plant species are placed on top of the soil in the pans. The soil required to fill a pan is weighed and admixed with a phytotoxic formulation containing a sufficient amount of active ingredient to obtain the desired rate of active ingredient per acre. Each component of the active ingredient is also separately admixed with soil by the same method. The pans are then filled with the various admixtures and leveled.

The seed containing pans are placed on a wet sand bench and maintained under ordinary conditions of sunlight and watering. The plants are observed at the end of approximately four weeks, except for Tables 7 and 8 which are 18 day observations, and the results recorded. The phytotoxic activity index is based on the average percent control of each seed lot. The phytotoxic activity index is converted to a relative numerical scale for the sake of brevity and simplicity in the tables.

The phytotoxic activity index used is defined as follows.

| Average percent control: | Numerical scale |
|---|---|
| 0 to 25 | 0 |
| 26 to 50 | 1 |
| 51 to 75 | 2 |
| 76 to 100 | 3 |

The results of replicate tests are averaged and are given below in Tables 1 through 10.

In Tables 1 through 10 the various plant species are represented by the following terms:

Cocklebur—CB
Coffee weed—CW
Jimson weed—JW
Morning glory—MG
Smartweed—SW
Velvet leaf—VL

TABLE 5

[Phytotoxic activity of 2',6'-diethyl-N-methoxymethyl-2-chloroacetanilide (A) and 3'-(methylcarbamoyloxy)-2-methylvaleranilide (F)]

| Plant | Compound F ½ lb./a. | Compound F ¼ lb./a. | Compound A ½ lb./a. | Compounds F plus A ½ plus ½ lb./a. | Compounds F plus A ¼ plus ½ lb./a. |
|---|---|---|---|---|---|
| JW | 2 | 0.5 | 0 | 3 | 1 |
| MG | 2.5 | | 0 | 3 | |

TABLE 6

Phytotoxic activity of 2',6'-diethyl-N-methoxymethyl-2-chloroacetanilide (A) and 3'-(n-butylcarbamoyloxy)-2-methylpropionanilide (G)

Plant—VL

Compound G:
  ½ lb./a. _____ 2.5
  ¼ lb./a. _____ 0.5
Compound A—½ lb./a. _____ 0
Compounds G+A:
  ½ + ½ lb./a. _____ 3
  ¼ + ½ lb./a. _____ 1.5

TABLE 1

[Phytotoxic activity of 2',6'-diethyl-N-methoxymethyl-2-chloroacetanilide (A) and 3'-(t-butylcarbamoyloxy propionanilide (B)]

| Plant | Compound B ¼ lb./a. | Compound B ⅛ lb./a. | Compound B ¹⁄₁₆ lb./a. | Compound A ½ lb./a. | Compounds B plus A ¼ plus ½ lb./a. | Compounds B plus A ⅛ plus ½ lb./a. | Compounds B plus A ¹⁄₁₆ plus ½ lb./a. |
|---|---|---|---|---|---|---|---|
| MG | 1.5 | 1.5 | 1.0 | 0 | 3 | 2 | 2 |
| VL | 2 | 2.5 | | 0 | 3 | 3 | |

TABLE 2

[Phytotoxic activity of 2',6'-diethyl-N-methoxymethyl-2-chloroacetanilide (A) and 3'-(t-butylcarbamoyloxy)-2-methylpropionanilide (C)]

| Plant | Compound C 1 lb./a. | Compound C ½ lb./a. | Compound C ¼ lb./a. | Compound A ½ lb./a. | Compounds C plus A 1 plus ½ lb./a. | Compounds C plus A ½ plus ½ lb./a. | Compounds C plus A ¼ plus ½ lb./a. |
|---|---|---|---|---|---|---|---|
| JW | 2.5 | 1.5 | 0.5 | 0 | 3 | 3 | 1 |
| MG | 2.7 | 1.0 | | 0 | 2.7 | 3.0 | |

TABLE 3

[Phytotoxic activity of 2',6'-diethyl-N-methoxymethyl-2-chloroacetanilide (A) and 3'-(t-butylcarbamoyloxy)-2-methylvaleranilide (D)]

| Plant | Compound D ½ lb./a. | Compound D ¼ lb./a. | Compound D ⅛ lb./a. | Compound A ½ lb./a. | Compounds D plus A ½ plus ½ lb./a. | Compounds D plus A ¼ plus ½ lb./a. | Compounds D plus A ⅛ plus ½ lb./a. |
|---|---|---|---|---|---|---|---|
| JW | 2 | 2 | 2 | 0 | 3 | 3 | 3 |
| MG | 2 | 0 | | 0 | 3 | 3 | |
| VL | | | 0 | 0 | | | 2.5 |
| CW | | 1 | 1 | 1 | | 3 | 3 |

TABLE 4

[Phytotoxic activity of 2',6'-diethyl-N-methoxymethyl-2-chloroacetanilide (A) and 3'-(n-propylcarbamoyloxy)-2-methylpropionanilide (E)]

| Plant | Compound E 2 lb./a. | Compound E 1 lb./a. | Compound E ½ lb./a. | Compound E ¼ lb./a. | Compound A ½ lb./a. | Compounds E plus A 2 plus ½ lb./a. | Compounds E plus A 1 plus ½ lb./a. | Compounds E plus A ½ plus ½ lb./a. | Compounds E plus A ¼ plus ½ lb./a. |
|---|---|---|---|---|---|---|---|---|---|
| JW | 2 | 1 | 0 | 0 | 0 | 3 | 3 | 2.5 | 1.1 |
| MG | | | | 1.5 | 0 | | | | 2.3 |
| SW | | | 0 | 0 | 1 | | | 3 | 5 |
| VL | | 2 | 0 | 0 | 0 | | | 3 | 1 | 5 |

TABLE 7

[Phytotoxic activity of 2',6'-diethyl-N-methoxymethyl-2-chloroacetanilide (A) and 3'-(isopropylcarbamoyloxy)propionanilide (H)]

| Plant | Compound H | | | Compound A | Compounds H plus A | | |
|---|---|---|---|---|---|---|---|
| | 2 lb./a. | 1 lb./a. | ½ lb./a. | ½ lb./a. | 2 plus ½ lb./a. | 1 plus ½ lb./a. | ≥ plus ½ lb./a. |
| CW | | 2 | 1.5 | 0 | | 2.5 | 2.5 |
| MG | 2 | 1.5 | 0 | 0 | 3 | 2.5 | 2 |
| VL | | | 1 | 0 | | | 3 |

TABLE 8

[Phytotoxic activity of 2',6'-diethyl-N-methoxymethyl-2-chloroacetanilide (A) and 3'-(ethylcarbamoyloxy)propionanilide (I)]

| Plant | Compound I | | Compound A | Compounds I plus A | |
|---|---|---|---|---|---|
| | 1 lb./a. | ½ lb./a. | ½ lb./a. | 1 plus ½ lb./a. | ½ plus ½ lb./a. |
| CW | | 0 | 0 | | 1.0 |
| VL | 2.5 | | 0 | 3.0 | |

TABLE 9

[Phytotoxic activity of 2',6'-diethyl-N-methoxymethyl-2-chloroacetanilide (A) and 3'-(cyclohexylcarbamoyloxy)propionanilide (J)]

| Plant | Compound J | | | Compound A | Compounds J plus A | | |
|---|---|---|---|---|---|---|---|
| | 1 lb./a. | ½ lb./a. | ¼ lb./a. | ½ lb./a. | 1 plus ½ lb./a. | ½ plus ½ lb./a. | ¼ plus ½ lb./a. |
| CB | 0 | | 0 | 0 | 1 | | 1 |
| JW | 2 | 0.5 | 0 | 0 | 3 | 3 | 3 |
| MG | 2.5 | 2.5 | 1 | 0 | 3 | 3 | 3 |
| SW | | | | 1 | 1 | | 3 |
| VL | | 2 | 0 | 0 | | 3 | 3 |

EXAMPLE 10

Phytotoxic activity of 2',6'-diethyl-N-methoxymethyl-2-chloroacetanilide (A) and 3'-(t-butylcarbamoyloxy)cyclopropanecarboxanilide (K)

Plant—JW

Compound K:
  1 lb./a. ---------------------------------- 2.5
  ½ lb./a. ---------------------------------- 1
Compound A—½ lb./a. --------------------- 0
Compound K+A:
  1+½ lb./a. ------------------------------- 3
  ½+½ lb./a. ------------------------------- 2

As mentioned hereinbefore the phytotoxic compositions of this invention can be admixed with one or more adjuvants which can be solid or liquid extenders, carriers, diluents, conditioning agents and the like. Preferred phytotoxic formulations containing the active ingredients of this invention have been developed so that the active ingredients can be used to the greatest advantage to modify the growth of plants. The preferred formulations comprise wettable powders, aqueous suspensions, dust formulations, granules, emulsifiable oils and solutions in solvents. In general, these preferred formulations can all contain one or more surface-active agents.

Surface-active agents which can be used in the phytotoxic formulations of this invention are set out, for example, in Searle U.S. Patent 2,426,417, Todd U.S. Patent 2,655,447, Jones U.S. Patent 2,412,510 and Lenher U.S. Patent 2,139,276. A detailed list of such agents is also set forth by J. W. McCutcheon in "Soap and Chemical Specialties," November 1947, page 8011 et seq., entitled "Synthetic Detergents"; "Detergents and Emulsifiers—Up to Date" (1960), by J. W. McCutcheon, Inc., and Bulleton E–607 of the Bureau of Entomology and Plant Quarantine of the U.S.D.A. In general, less than 50 parts by weight of the surface-active agent is present per 100 parts by weight of plant growth regulant composition.

Wettable powders are water-dispersible formulations containing one or more active ingredients, an inert solid extender and one or more wetting and dispersing agents. The inert solid extenders are usually of mineral origin such as the natural clays, diatomaceous earth and synthetic minerals derived from silica and the like. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils, ditertiary acetylinic glycols, polyoxyethylene derivatives of alkylphonols (particularly isooctylphenol and nonylphenol) and polyoxyethylene derivatives of the mono-higher fatty esters of hexitol anhydride (e.g. sorbitan). Preferred disperants are methyl cellulose, polyvinyl alcohol, sodium lignin sulfonates, polymeric alkyl naphthalene sulfonates, sodium naphthalene sulfonate, polymethylene bisnaphthalene-sulfonate and sodium N-methyl-N-(long chain acid) taurates.

Wettable powder formulations usually contain from about 5 to about 95 parts by weight of active ingredient, from about 0.25 to 25 parts by weight of wetting agent, from about 0.25 to 25 parts by weight of dispersant and from 4.5 to about 94.5 parts by weight of inert solid extender, all parts being by weight of the total formulation. When required from about 0.1 to 2.0 parts by weight of the solid inert extender can be replaced by a corresion inhibitor or anti-foaming agent or both.

Aqueous suspensions can be prepared by mixing together and grinding an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense finely divided particulate formulations which are intended for application to the soil in dry form. Dusts are characterized by their free-flowing and rapid settling properties so that they are not readily wind-borne to areas where they are of no value. Dusts contain primarly an active ingredient and a dense, free-flowing finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be either of vegetable or mineral origin. The solid extenders are characterized by possessing relatively low surface areas and are poor in liquid absorption. Suitable inert solid extenders for plant growth regulant dusts include micaceous talcs, pyrophyllite, dense kaolin clays, ground calcium phosphate rock and tobocco dust. The dusts usually contain from about 0.5 to 95 parts active ingredient, 0 to 50 parts grinding aid, 0 to 50 parts wetting agent and 5 to 99.5 parts dense solid extender, all parts being by weight and based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible or partially water-immiscible solvents together with a surface active agent. Suitable solvents for the active ingredient of this invention include hydrocarbons and water-immiscible ethers, esters or ketones. Suitable surface active agents are anionic, cationic and non-ionic such as alkyl aryl polyethoxy alcohols, polyethylene sorbitol or sorbitan fatty acid esters, polyethylene glycol fatty esters, fatty alkyllol amide condensates, amine salts of fatty alcohol sulfates together with long chain alcohols and oil soluble petroleum sulfonate or mixtures thereof. The emulsifiable oil compositions generally contain from about 5 to 95 parts active ingredients, about 1 to 50 parts surface active agent and about 4 to 94 parts solvent, all parts being by weight based on the total weight of emulsifiable oil.

Granules are physically stable particulate formulations comprising active ingredient adhering to or distributed through a basic matrix of an inert, finely-divided particulate extender. In order to aid leaching of the active ingredient from the particulate, a surface active agent such as those listed hereinbefore under wettable powders can be present in the composition. Natural clays, pyrophyllites, illite and vermiculite are examples of operable classes of particulate mineral extenders. The preferred extenders are the porous, absorptive, preformed particles such as preformed and screened particulate attapulgite or heat expanded, particulate vermiculite, and the finely-divided clays such as kaolin clays, hydrated attapulgite or bentonitic clays. These extenders are sprayed or blended with the active ingredient to form the phytotoxic formulation.

The mineral particles which are used in the phytotoxic formulations usually have a size range of 10 to 100 mesh, but preferably such that a large majority of the particles have from 14 to 60 mesh with the optimum size being from 20 to 40 mesh. Clay having substantially all particles between 14 and 80 mesh and at least about 80 percent between 20 and 40 mesh is particularly preferred for use in the phytotoxic formulations. The term "mesh" as used herein means U.S. Sieve Series.

The granular phytotoxic formulations generally contain from about 5 parts to about 30 parts by weight of active ingredient per 100 parts by weight of clay and 0 to about 5 parts by weight of surface active agent per 100 parts by weight of particulate clay. The preferred granular formulations contain from about 10 parts to about 25 parts by weight of active ingredient per 100 parts by weight of clay.

The phytotoxic formulations can also contain other additaments, for example fertilizers, phytotoxicants, other plant growth regulants, pesticides and the like used as adjuvant or in combination with any of the above-described adjuvants. Chemicals useful in combination with the active ingredients of this invention include for example the compounds disclosed in application Ser. No. 496,175 filed Oct. 14, 1965, now abandoned, and application Ser. No. 647,202, filed of even date herewith.

Fertilizers useful in combination with the active ingredients include for example ammonium nitrate, urea, potash, and superphosphate. Other useful additaments include materials in which plant organisms take root and grow such as compost, manure, humus, sand and the like.

When operating in accordance with the present invention, effective amounts of the active ingredients are dispersed in or on soil or plant growth media and/or applied to above ground portions of plants in any convenient fashion. Application to the soil or growth media can be carried out by simply admixing with the soil, by applying to the surface of the soil and thereafter dragging or discing into the soil to the desired depth, or by employing a liquid carrier to accomplish the penetration and impregnation. The application of liquid and particulate solid phytotoxic formulations to the surface of soil or to about ground portions of plants can be carried out by conventional methods, e.g. power dusters, boom and hand sprayers and spray dusters. The formulations can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the plant growth regulants.

The application of an effective amount of the active ingredients of this invention to the soil or growth media and/or plant is essential and critical for the practice of one embodiment of the present invention. The exact amount of active ingredient to be employed is dependent upon the response desired in the plant as well as such other factors as the plant species and stage of development thereof, the specific soil and depth at which the active ingredients are distributed in the soil and the amount of rainfall as well as the specific active ingredient employed. In foliar treatment for the modification of vegetative growth, the active ingredients are applied in amounts from about 1 to about 50 or more pounds per acre. In applications to soil for the modification of the growth of germinant seeds, germinative seeds, emerging seedlings and established vegetation, the active ingredients are applied in amounts from about 0.001 to about 25 or more pounds per acre. In such soil applications, it is desirable that the active ingredients be distributed to a depth of at least 0.2 inches. In selective pre-emergence phytotoxic applications the active ingredients are usually applied in amounts from about 0.001 to 5 pounds per acre. It is believed that one skilled in the art can readily determine from the teachings of this specification, including examples, the application rate for any situation.

The terms "soil" and "growth media" are employed in the present specification and claims in their broadest sense to be inclusive of all conventional "soils" as defined in Webster's New International Dictionary, Second Edition, Unabridged (1961). Thus, the terms refer to any substance or media in which vegetation may take root and grow, and are intended to include not only earth but also compost, manure, muck, humus, sand and the like, adapted to support plant growth.

The 2',6'-diethyl-N-methoxymethyl-2-chloroacetanilide component of the compositions of this invention can be prepared by the processes described in application Ser. No. 496,175, filed Oct. 14, 1965, now abandoned. The 3'-(carbamoyloxy)anilide components can be prepared by the processes described in application Ser. No. 647,202, filed of even date herewith.

Although the invention is described with respect to specific modifications, the details thereof are not to be construed as limitations except to the extent indicated in the following claims.

The embodiments of the invention in which an exclusive property or privilege is claimed are defined as follows:

1. Method of controlling the growth of plants which comprises contacting a plant to a herbicidal effective amount of a composition comprising 2′,6′- diethyl-N-methoxymethyl-2-chloroacetanilide and a 3′-(carbamoyloxy)-anilide selected from the group consisting of 3′-(t-butylcarbamoyloxy)propionanilide, 3′-(t-butylcarbamoyloxy)-2-methylpropionalide, 3′ - (t - butylcarbamoyloxy)-2 - methylvaleranilide, 3′ - (n - propylcarbamoyloxy)-2 - methylpropionalide, 3′ - (methylcarbamoyloxy) - 2-methylvaleranilide, 3′ - (n-butylcarbamoyloxy)-2-methylpropionanilide, 3′ - (isopropylcarbamoyloxy)propion-anilide, 3′ - (ethylcarbamoyloxy)propionanilide, 3′-(cyclohexylcarbamoyloxy) propionanilide, and 3′ - (t - butylcarbamoyloxy)cyclopropanecarboxanilide, said 3′ - (carbamoyloxy)anilide being present in an amount from about 1 to about 100 parts by weight per 10 parts by weight of 2′,6′-diethyl-N-methoxymethyl-2-chloroacetanilide.

2. Method of claim 1 wherein the 3′-(carbamoyloxy)-anilide is 3′-(isopropylcarbamoyloxy)propionalide.

3. Method of claim 1 wherein the 3′-(carbamoyloxy)-anilide is 3′-(cyclohexylcarbamoyloxy)propionanilide.

4. Method of claim 1 wherein the 3′-(carbamoyloxy)-anilide is 3′-(t-butylcarbamoyloxy)propionanilide.

5. Method of claim 1 wherein the 3′-(carbamoyloxy)-anilide is present in an amount from about 5 to about 50 parts by weight per 10 parts by weight of the 2′,6′-diethyl-N-methoxy-methyl-2-chloroacetanilide.

6. Method of selectively inhibiting the growth of plants in the presence of corn which comprises applying to the area where said effect is desired a herbicidal effective amount of a herbicidal composition comprising 2′,6′-diethyl-N-methoxymethyl-2-chloroacetanilide and a 3′-(carbamoyloxy)anilide selected from the group consisting of 3′-(t-butyl - carbamoyloxy)propionanilide, 3′ - (t - butylcarbamoyloxy) - 2 - methylpropionanilide, 3′ - (t - butylcarbamoyloxy) - 2 - methylvaleranilide, 3′ - (n - propyl-carbamoyloxy) - 2 - methylpropionanilide, 3′ - (methylcarbamoyloxy) - 2 - methylvaleranilide, 3′ - (n - butylcarbamoyloxy) - 2 - methylpropionanilide, 3′ - (isopropylcarbamoyloxy)propionanilide, 3′ - (ethylcarbamoyloxy)propionanilide, 3′ - (cyclohexylcarbamoyloxy)propionanilide, and 3′ - (t - butylcarbamoyloxy)cyclopropanecarboxanilide, said 3′ - (carbamoyloxy)anilide being present in an amount from about 1 to about 100 parts by weight per 10 parts by weight of 2′,6′-diethyl-N-methoxymethyl-2-chloroacetanilide.

7. Method of claim 6 wherein the 3′-(carbamoyloxy)-anilide is 3′-(isopropylcarbamoyloxy)propionanilide.

8. Method of claim 6 wherein the 3′-(carbamoyloxy)-anilide is 3′-(cyclohexylcarbamoyloxy)propionanilide.

9. Method of claim 6 wherein the 3′-(carbamoyloxy)-anilide is 3′-(t-butylcarbamoyloxy) propionanilide.

10. Herbicidal composition comprising a herbicidal effective amount of a composition comprising 2′,6′-diethyl- - N - methoxymethyl - 2 - chloroacetanilide and a 3′-(carbamoyloxy)anilide selected from the group consisting of 3′-(t-butylcarbamoyloxy)propionanilide, 3′-(t-butylcarbamoyloxy) - 2 - methylpropionanilide, 3′-(t-butylcarbamoyloxy) - 2 - methylvaleranilide, 3′-(n-propylcarbamoyloxy) - 2 - methylpropionanilide, 3′-(methylcarbamoyloxy) - 2 - methylvaleranilide, 3′ - (n - butylcarbamoyloxy) - 2 - methylpropionanilide, 3′ - isopropylcarbamoyloxy)propionanilide, 3′ - (ethylcarbamoyloxy)-propionanilide, 3′ - (cyclohexylcarbamoyloxy)propionanilide, and 3′ - (t - butylcarbamoyloxy)cyclopropane-carboxanilide, said 3′ - (carbamoyloxy)anilide being present in an amount from about 1 to about 100 parts by weight per 10 parts by weight of 2′,6′-diethyl-N-methoxymethyl-2-chloroacetanilide.

11. Composition of claim 10 wherein the 3′-(carbamoyloxy)anilide is 3′-(isopropylcarbamoyloxy)propionanilide.

12. Composition of claim 10 wherein the 3′-(carbamoyloxy)anilide is 3′-cyclohexylcarbamoyloxy)propionanilide.

13. Composition of claim 10 wherein the 3′-(carbamoyloxy)anilide is 3′-(t-butylcarbamoyloxy)propionanilide.

14. Composition of claim 10 wherein the 3′-(carbamoyloxy)anilide is present in an amount from about 5 to about 50 parts by weight per 10 parts by weight of 2′,6′-diethyl-N-methoxy-methyl-2-chloroacetanilide.

15. Composition of claim 10 together with a particulate solid adjuvant.

16. Composition of claim 10 together with a liquid adjuvant.

17. Composition of claim 10 together with a surface-active agent.

18. Method of selectively inhibiting the growth of plants in the presence of cotton which comprises applying to the area where said effect is desired a herbicidally effective amount of a herbicidal composition comprising 2′,6′-diethyl-N-methoxymethyl - 2 - chloroacetanilide and a 3′ - (carbamoyloxy)anilide selected from the group consisting of 3′-(t-butylcarbamoyloxy)propionanilide, 3′-(t-butylcarbamoyloxy) - 2 - methylpropionanilide, 3′-(t-butylcarbamoyloxy) - 2 - methylvaleranilide, 3′-(n-propylcarbamoyloxy) - 2 - methylpropionanilide, 3′ - (methylcarbamoyloxy) - 2 - methylvaleranilide, 3′-(n-butylcarbamoyloxy) - 2 - methylpropionanilide, 3′ - (isopropylcarbamoyloxy)propionanilide, 3′ - (ethylcarbamoyloxy)-propionanilide, 3′ - (cyclohexylcarbamoyloxy)propionanilide, and 3′ - (t - butylcarbamoyloxy)cyclopropanecarboxanilide, said 3′ - (carbamoyloxy)anilide being present in an amount from about 1 to about 100 parts by weight per 10 parts by weight of 2′,6′-diethyl-N-methoxymethyl 2-chloroacetanilide.

19. Method of claim 18 wherein the 3′ - carbamoyloxy)anilide is 3′ - (isopropylcarbamoyloxy)propionanilide.

20. Method of claim 18 wherein the 3′-(carbamoyloxy)-anilide is 3′-(cyclohexylcarbamoyloxy)propionanilide.

21. Method of claim 18 wherein the 3′-(carbamoyloxy)-anilide is 3′-(t-butylcarbamoyloxy)propionanilide.

22. Method of selectively inhibiting the growth of plants in the presence of soybean which comprises applying to the area where said effect is desired a herbicidal effective amount of a herbicidal composition comprising 2′,6′-diethyl - N - methoxymethyl - 2 - chloroacetanilide and a 3′ - (carbamoyloxy)anilide selected from the group consisting of 3′ - (t - butyl - carbamoyloxy) - propionanilide, 3′ - (t - butylcarbamoyloxy) - 2 - methylpropionanilide, 3′ - (t - butylcarbamoyloxy) - 2 - methylvaleranilide, 3′ - (n-propylcarbamoyloxy) - 2 - methylpropionanilide, 3′ - (methylcarbamoyloxy) - 2 - methylvaleranilide, 3′ - (n-butylcarbamoyloxy) - 2 - methylpropionanilide, 3′-(isopropylcarbamoyloxy)propionanilide, 3′-(ethylcarbamoyloxy)propionanilide, 3′ - (cyclohexylcarbamoyloxy)propionanilide, and 3′ - (t-butylcarbamoyloxy)cyclopropanecarboxanilide, said 3′ - (carbamoyloxy)anilide being present in an amount from about 1 to about 100 parts by weight per 10 parts by weight of 2′,6′-diethyl-N-methoxymethyl-2-chloroacetanilide.

23. Method of claim 22 wherein the 3′-(carbamoyloxy)anilide is 3′-(isopropylcarbamoyloxy)propionalide.

24. Method of claim 22 wherein the 3′-(carbamoyloxy)anilide is 3′ - (cyclohexylcarbamoyloxy)propionanilide.

25. Method of claim 22 wherein the 3′-(carbamoyloxy)anilide is 3′-(t-butylcarbamoyloxy)propionanilide.

(References on following page)

References Cited

UNITED STATES PATENTS

| | | | |
|---|---|---|---|
| 3,345,151 | 10/1967 | Olin | 71—93X |
| 3,404,975 | 10/1968 | Wilson et al. | 71—111X |
| 3,404,976 | 10/1968 | Olin | 71—93X |
| 3,442,945 | 5/1969 | Olin | 71—118X |

FOREIGN PATENTS 622,131  12/1962  Belgium.

JAMES O. THOMAS, JR., Primary Examiner

U.S. Cl. X.R.

71—118